US009225708B2

(12) United States Patent
Hwang

(10) Patent No.: US 9,225,708 B2
(45) Date of Patent: Dec. 29, 2015

(54) METHOD FOR AUTHENTICATED ENCRYPTION AND DECRYPTION

(71) Applicant: NATIONAL CHENG KUNG UNIVERSITY, Tainan (TW)

(72) Inventor: Tzonelih Hwang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 14/323,845

(22) Filed: Jul. 3, 2014

(65) Prior Publication Data

US 2015/0010142 A1    Jan. 8, 2015

(30) Foreign Application Priority Data

Jul. 4, 2013   (TW) .............................. 102123966 A

(51) Int. Cl.
*H04L 29/08*   (2006.01)
*H04L 29/06*   (2006.01)
*G09C 1/00*   (2006.01)
*H04L 9/06*   (2006.01)

(52) U.S. Cl.
CPC  *H04L 63/08* (2013.01); *G09C 1/00* (2013.01); *H04L 9/0637* (2013.01); *H04L 63/0428* (2013.01)

(58) Field of Classification Search
CPC ................................. H04L 9/14; H04L 63/08

USPC .............. 380/28, 30, 263, 277; 713/153, 155, 713/188
See application file for complete search history.

(56) References Cited

U.S. PATENT DOCUMENTS 8,850,200 B1 *  9/2014  Horgan ......................... 713/168
2006/0056623 A1 *  3/2006  Gligor et al. .................... 380/28
2011/0286596 A1 * 11/2011  Gressel et al. ................ 380/268

OTHER PUBLICATIONS

"Duplexing the sponge: single-pass authenticated encryption and other applications"—Bertoni et al, Sponge Duplex, Apr. 2011 http://sponge.noekeon.org/SpongeDuplex.pdf.*

* cited by examiner

*Primary Examiner* — Randy Scott
(74) *Attorney, Agent, or Firm* — Muncy, Geissler, Olds & Lowe P.C.

(57) ABSTRACT

In this invention, a new authenticated encryption and decryption technique has been proposed. In general, conventional encryption modes like (CTR, CBC, and CFB etc.) cannot provide integrity support and in order to ensure both the privacy and integrity, they require two passes and additional support like MAC, CRC etc. However, this new authenticated encryption technique can ensure both the privacy and integrity in single pass without any MAC or CRC support. Most importantly, this new technique can easy be incorporated with the existing encryption modes. As a consequence of the integration, the existing encryption modes can resolve several security issues related to integrity, without impairing their existing security properties.

5 Claims, 4 Drawing Sheets

(a)

(b)

METHOD FOR AUTHENTICATED ENCRYPTION AND DECRYPTION

CROSS-REFERENCE TO RELATED APPLICATION

This application claims the benefit of Taiwan Patent Application No. 102123966, filed on Jul. 4, 2013, in the Taiwan Intellectual Property Office, the disclosure of which is incorporated herein in its entirety by reference.

BACKGROUND OF THE INVENTION

1. Field of the Invention

The present disclosure is related to a method for authenticated encryption and decryption, particularly, to method for authenticated encryption and decryption capable of being integrated with other encryption and decryption algorithms.

2. Description of the Related Art

Due to the growing popularity of computer systems and the Internet, using the Internet to transmitting computer data becomes one of the indispensable parts of people's lives. Therefore, how to ensure that others are not being spied on or changed the computer data during data transmission becomes an extremely important area of research.

In general, the privacy and the authentication are two most important issues in the field of data transmission. The privacy can be achieved by encrypting data blocks of the data to be transmitted. The authentication can utilize the message authentication code or the checksum verification inserted in the data to ensure the correctness of data. For integrating the two issues, in the prior art, attaching the message authentication code or utilizing the hashing function is employed to achieve the purpose of the authentication. However, such method requires additional transmission space or additional computation cost to transmit data.

Accordingly, the inventor of this invention designs a method for authenticated encryption and decryption capable of encrypting a binary plain text block and being integrated with both of the privacy and the authentication. The drawbacks of the current studies can be improved by integrating the method into these studies, so as to enhance the usage of the encryption and decryption for the data transmission.

SUMMARY OF THE INVENTION

Based on the purpose of the present invention, a method for authenticated encryption and decryption is proposed. The method comprises following steps: receiving a binary plain text at an encryption end; performing an encryption process according to the binary plain text data, the encryption process comprising following steps: providing n encryption paths, wherein n is a positive integer; providing a first input encryption parameter $A_t$ to the t-th path of the n encryption paths correspondingly, wherein t is an integer, $1 \le t \le n$, $0 \le r < t$, r is an integer, and $A_{t+r}$ is a function $f(M_t)$ with an input parameter of a binary plain text $M_t$; performing a first encryption logic computation for the first input encryption parameter $A_t$ of the t-th path correspondingly so as to generate a first middle encryption value $B_t$; performing an encryption computation for the first middle encryption value $B_t$ of the t-th path and an encryption kernel correspondingly so as to generate a second middle encryption value $F_t$; providing a second input encryption parameter $G_t$ to the t-th path of the n encryption paths correspondingly, wherein $0 \le s < t$, s is an integer, and $G_{t+s}$ is a function $f(M_t)$ with an input parameter of the binary plain text $M_n$; performing a second encryption logic computation for the second middle encryption value $F_t$ in the t-th path and the second input encryption parameter $G_t$ so as to generate a cipher text $C_t$; providing p encryption/authentication paths, wherein p is a positive integer; providing a first encryption/authentication parameter $AV_j$ to a j-th path of p encryption/authentication paths correspondingly, wherein $1 \le j \le p$; performing a first encryption/authentication logic computation for the first encryption/authentication parameter $AV_j$ of the j-th encryption/authentication path correspondingly so as to generate a first middle encryption/authentication value $BV_j$; performing an encryption computation for the first middle encryption/authentication value $BV_j$ of the j-th encryption/authentication path and the encryption kernel correspondingly so as to generate a second middle encryption/authentication value $FV_j$ of the j-th encryption/authentication path; providing a second encryption/authentication data $GV_j$ to the j-th path; performing a second encryption/authentication logic computation for the second middle encryption/authentication value $FV_j$ of the j-th encryption/authentication path and the second encryption/authentication data $GV_j$ correspondingly so as to generate a cipher text $C_{n+j}$; receiving the cipher text $C_{n+j}$ at a decryption end and performing a decryption process, the decryption process comprising following steps: providing n decryption paths; providing a first input decryption parameter $J_t$ to a t-th path of the n decryption paths correspondingly, wherein $1 \le t \le n$; performing a first decryption logic computation for the first input decryption parameter $J_t$ of the t-th path correspondingly so as to generate a first middle decryption value $K_t$; performing a decryption computation for the first middle decryption value $K_t$ of the t-th path and a decryption kernel correspondingly so as to generate a second middle decryption value $L_t$; performing a second logic decryption computation for the second middle decryption value $L_t$ of the t-th path and a second input decryption parameter $N_t$ so as to generate a decrypted binary plain text $M_t'$; providing p decryption/authentication paths, wherein p is a positive integer; providing a first decryption-authentication parameter $JV_j$ to a j-th decryption/authentication path of the p decryption/authentication paths correspondingly, wherein $1 \le j \le p$; performing a first logic decryption/authentication computation for the first decryption-authentication parameter $JV_j$ of the j-th decryption/authentication path correspondingly so as to generate a first middle decryption/authentication value $KV_j$; performing a decryption computation for the first middle decryption value $KV_j$ of the j-th decryption/authentication path and the decryption kernel correspondingly so as to generate a second middle decryption/authentication value $LV_j$ of the j-th decryption/authentication path; and performing a second logic decryption/authentication computation for the second middle decryption/authentication value $LV_j$ of the j-th decryption/authentication path and second decryption/authentication data $NV_j$ so as to generate a plain text of decryption an authentication $MV_j$.

Preferably, in the encryption process, r=0 and s=1; the first input encryption parameter $A_t$ of the t-th path of the n encryption paths further comprises a t-th output $ctr_t$ of a counter, $1 \le t \le n$; the first encryption logic computation is an Exclusive OR logic computation and it is performed for the first input encryption parameter $A_t$ so as to generate the first middle encryption value $B_t$; the encryption kernel is a block encryption $E_K$ controlled by a positive integer K; the second input encryption parameter $G_1$ of the first path of the n encryption paths is a first output $ctr_1$ of the counter; the second encryption logic computation is another Exclusive OR logic computation; p=1; the first encryption/authentication logic computation and the second encryption/authentication logic computation are an Exclusive OR logic computation correspondingly; the first encryption/authentication parameter $AV_p$ is a default EV (Ending Vector) and a (n+1)-th output $ctr_{n+1}$ of the counter; the second encryption/authentication data $GV_p$ comprises the function $f(M_n)$ with an input parameter of the binary plain text $M_n$; in the decryption process, s=1; the first input decryption parameter $J_1$ of the first path of the n decryption paths comprises the first output $ctr_1$ of the counter; the first input decryption parameter $J_{t+s}$ comprises the function $f(M_t')$ with an input parameter of the decrypted binary plain text $M_t'$, $1 \le t \le n$; the first decryption logic computation is an Exclusive OR logic computation and it is performed for the cipher text $C_t$ and the first input decryption parameter $J_t$ so as to generate the first middle decryption value $K_t$; the decryption kernel is a block decryption $D_K$ controlled by a positive integer K; the second logic decryption computation is an Exclusive OR logic computation; the second input decryption parameter $N_t$ of the t-th path of the n decryption paths is a t-th output $ctr_t$ of the counter; p=1; the first logic decryption/authentication computation is an Exclusive OR logic computation; the cipher text $C_{n+p}$ and the first decryption-authentication parameter $JV_p$ comprises the function $f(M_n')$ with an input parameter of the decrypted binary plain text $M_n'$ so as to perform the first logic decryption/authentication computation, the second logic decryption/authentication computation is an Exclusive OR logic computation, and the second decryption/authentication data $NV_p$ is a (n+p)-th output $ctr_{n+p}$ of the counter.

Preferably, in the encryption process, r=0 and s=1; the first input encryption parameter $A_t$ of the t-th path of the n encryption paths further comprises an incrementing function $\Delta_t$, $1 \le t \le n$ and $\Delta_1 \ne \Delta_2 \ne \ldots \ne \Delta_n$; the first encryption logic computation is an Exclusive OR logic computation and it is performed for the first input encryption parameter $A_t$ so as to generate the first middle encryption value $B_t$; the encryption kernel is a block encryption $E_K$ controlled by a positive integer K; the second input encryption parameter $G_1$ of a first path of the n encryption paths is the incrementing function $\Delta_1$; the second encryption logic computation is an Exclusive OR logic computation; an Exclusive OR logic computation is performed for the cipher text $C_h$ and the incrementing function $\Delta_h$ so as to generate a cipher text $C_h'$, $s < h \le n$; p=1; the first encryption/authentication logic computation and the second encryption/authentication logic computation are an Exclusive OR logic computation correspondingly; the first encryption/authentication parameter $AV_p$ comprises a default EV (Ending Vector) and the incrementing function $\Delta_{n+p}$; the second encryption/authentication data $GV_p$ comprises a function $f(M_n)$ with an input parameter of the binary plain text $M_n$; an Exclusive OR logic computation is further performed for the cipher text $C_{n+p}$ and an incrementing function $\Delta_{n+p}$ so as to generate a cipher text $C_{n+p}'$; in the decryption process, s=1; the first input decryption parameter $J_1$ of the first path of the n decryption paths comprises the incrementing function $\Delta_1$; the first input decryption parameter $J_{t+s}$ is a result of an Exclusive OR logic computation performed for the function $f(M_t)$ with an input parameter of the binary plain text $M_t$ and an incrementing function $\Delta_{t+s}$, $1 \le t \le n$; the first decryption logic computation is an Exclusive OR logic computation and it is performed for the cipher text $C_t'$ and the first input decryption parameter $J_t$ so as to generate the first middle decryption value $K_t$; the decryption kernel is a block decryption $D_K$ controlled by a positive integer K; the second input decryption parameter $N_t$ of the t-th path of the n decryption paths is the incrementing function $\Delta_t$; p=1; the first logic decryption/authentication computation is an Exclusive OR logic computation; the first decryption-authentication parameter $JV_p$ is a result of an Exclusive OR logic computation performed for the function $f(M_n')$ with an input parameter of the binary plain text $M_n'$ and the incrementing function $\Delta_{n+p}$; the second logic decryption/authentication computation is an Exclusive OR logic computation; the second decryption/authentication data $NV_p$ is the incrementing function $\Delta_{n+p}$.

Preferably, in the encryption process, s=0, r=p, and $2 \le p$; the first encryption logic computation is not provided to the top p paths of the n encryption paths; in the last (n−p) paths of the n encryption paths and the p encryption/authentication paths, the first encryption logic computation and the first encryption/authentication logic computation comprises an Exclusive OR logic computation; the encryption kernel is a block encryption $E_K$ controlled by a positive integer K; the second encryption logic computation of the n encryption paths comprises a computation of shift register and an Exclusive OR logic computation sequentially, the computation of shift register outputs an input value after shifting the input value by g bits, and g is a positive integer; the second encryption logic computation of the p encryption paths comprises a computation of shift register, and the computation of shift register outputs an input value after shifting the input value by g bits; from the first encryption path to the top p encryption paths, the first input encryption parameter $A_c$ of a c-th path comprises a c-th output $ctr_c$ of the counter, $1 \le c \le p$; the first input encryption parameter $A_d$ of the d-th path of the last (n−p) encryption paths further comprises a d-th output $ctr_d$, wherein $p+1 \le d \le n$; the first encryption/authentication parameter $AV_j$ of the p encryption/authentication paths comprises the function $f(M_{n+j-p})$ with the input parameter of the binary plain text $M_{n+j-p}$ and the (n+j)-th output $ctr_{n+j}$ of the counter, wherein $1 \le j \le p$; the second encryption/authentication data $GV_j$ is not provided to the p encryption/authentication paths; in the decryption process, s=0; the first decryption logic computation is not provided to the top p paths of the n decryption paths; in the last (n−p) paths of the n encryption paths and the p encryption/authentication paths, the first decryption logic computation and the first logic decryption/authentication computation comprises an Exclusive OR logic computation; the decryption kernel is the block encryption $E_K$, K is a positive integer; the second logic decryption computation of the n decryption paths comprises a computation of shift register and an Exclusive OR logic computation sequentially, and the computation of shift register outputs an input value after shifting the input value by g bits; the second logic decryption computation of the p encryption paths comprises a computation of shift register, and the computation of shift register outputs an input value after shifting the input value by g bits; from the first decryption path to the top p decryption paths, the first input decryption parameter $J_c$ of a c-th path comprises a c-th output $ctr_c$ of the counter, wherein $1 \le c \le p$; the first input decryption parameter $J_d$ of a d-th path in the last (n−p) decryption paths further comprises a d-th output $ctr_d$ of the counter and the function $f(M_{d-p}')$ with an input parameter of the decrypted binary plain text $M_{d-p}'$, wherein $p+1 \le d \le n$; the second input decryption parameter $N_t$ of the n decryption paths is the cipher text $C_t$, $1 \le t \le n$; the first decryption-authentication parameter $JV_j$ of the p decryption/authentication paths comprises the (n+j) output $ctr_{n+j}$ of the counter and the function $f(M_{n+j-p}')$ with an input parameter of the decrypted binary plain text $M_{n+j-p}'$, $1 \le j \le p$; and the second decryption/authentication data $NV_j$ is not provided to the p decryption/authentication paths.

Preferably, in the encryption process, s=0, r=p, and $2 \le p$; the first encryption logic computation is not provided to the top p paths of the n encryption paths; in the last (n−p) paths of the n encryption paths and the p encryption/authentication paths, the first encryption logic computation and the first encryption/authentication logic computation comprise an Exclusive OR logic computation; the encryption kernel is a block encryption $E_K$ controlled by a positive integer K; the second encryption logic computation of the n decryption paths comprises a computation of shift register and an Exclusive OR logic computation sequentially, wherein the computation of shift register outputs an input value after shifting g bits of the input value; the second encryption/authentication logic computation of the p encryption/authentication paths comprises an Exclusive OR logic computation and a computation of shift register, wherein the computation of shift register outputs an input value after shifting the input value by g bits; from the first encryption path to the top p encryption paths, the first input encryption parameter $A_c$ of a c-th path comprises an incrementing function $\Delta_c$, $1 \leq c \leq p$, and $\Delta_1 \neq \Delta_2 \neq \ldots \neq \Delta_p$; the first input encryption parameter $A_d$ of a d-th encryption path within the last (n−p) encryption paths further comprises the incrementing function $\Delta_d$, $p+1 \leq d \leq n$, and $\Delta_{p+1} \neq \Delta_{p+2} \neq \ldots \neq \Delta_n$; an Exclusive OR logic computation is performed for the second middle encryption value $F_t$ and an incrementing function $\Delta_t$ so as to generate another second middle encryption value $F_t'$, wherein $\Delta_1 \neq \Delta_2 \neq \ldots \neq \Delta_n$; the first encryption/authentication parameter $AV_j$ of the p encryption/authentication paths comprises the function $f(M_{n+j-p}')$ with the input parameter of the binary plain text $M_{n+j-p}'$ and the incrementing function $\Delta_{n+j}$, wherein $1 \leq j \leq p$; the second encryption/authentication data $GV_j$ of the p encryption/authentication paths comprises an incrementing function $\Delta_{n+j}$; in the decryption process, s=0; the first decryption logic computation is not provided to the top p paths of the n decryption paths; in the last (n−p) paths of the n encryption paths and the p encryption/authentication paths, the first decryption logic computation and the first logic decryption/authentication computation comprise an Exclusive OR logic computation; the decryption kernel is the block encryption $E_K$, K is a positive integer; the second logic decryption computation of the n decryption paths comprises a computation of shift register and an Exclusive OR logic computation sequentially, wherein the computation of shift register outputs an input value after shifting g bits of the input value; the second encryption/authentication logic computation of the p encryption/authentication paths comprises an Exclusive OR logic computation and a computation of shift register, wherein the computation of shift register outputs an input value after shifting the input value by g bits; from the first decryption path to the top p decryption paths, the first input decryption parameter $J_c$ of a c-th path comprises the incrementing function $\Delta_c$, wherein $1 \leq c \leq p$; the first input decryption parameter $J_d$ of a d-th path in last (n−p) decryption paths further comprises the incrementing function $\Delta_d$ and the function $f(M_{d-p}')$ with the input parameter of the decrypted binary plain text $M_{d-p}'$, wherein $p+1 \leq d \leq n$; an Exclusive OR logic computation is performed for the second middle decryption value $L_t$ and the incrementing function $\Delta_t$ so as to generate another second middle decryption value $L_t'$, $1 \leq t \leq n$; the second input decryption parameter $N_t$ of the n decryption paths comprises the cipher text $C_t$; the first decryption-authentication parameter $JV_j$ of the p decryption/authentication paths comprises the incrementing function $\Delta_{n+j}$ and the function $f(M_{n+j-p}')$ with the input parameter of the decrypted binary plain text $M_{n+j-p}'$, wherein $1 \leq j \leq p$; and the second decryption/authentication data $NV_j$ of the p decryption/authentication paths comprises an incrementing function $\Delta_{n+j}$.

According to the above description, the method for authenticated encryption and decryption in the invention can be integrated into the existing prior arts to achieve a good privacy. Furthermore, the method for authenticated encryption and decryption is simple and in wide use by using the Exclusion OR logic computation to lower the cost of authenticating the correctness of encryption and decryption.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
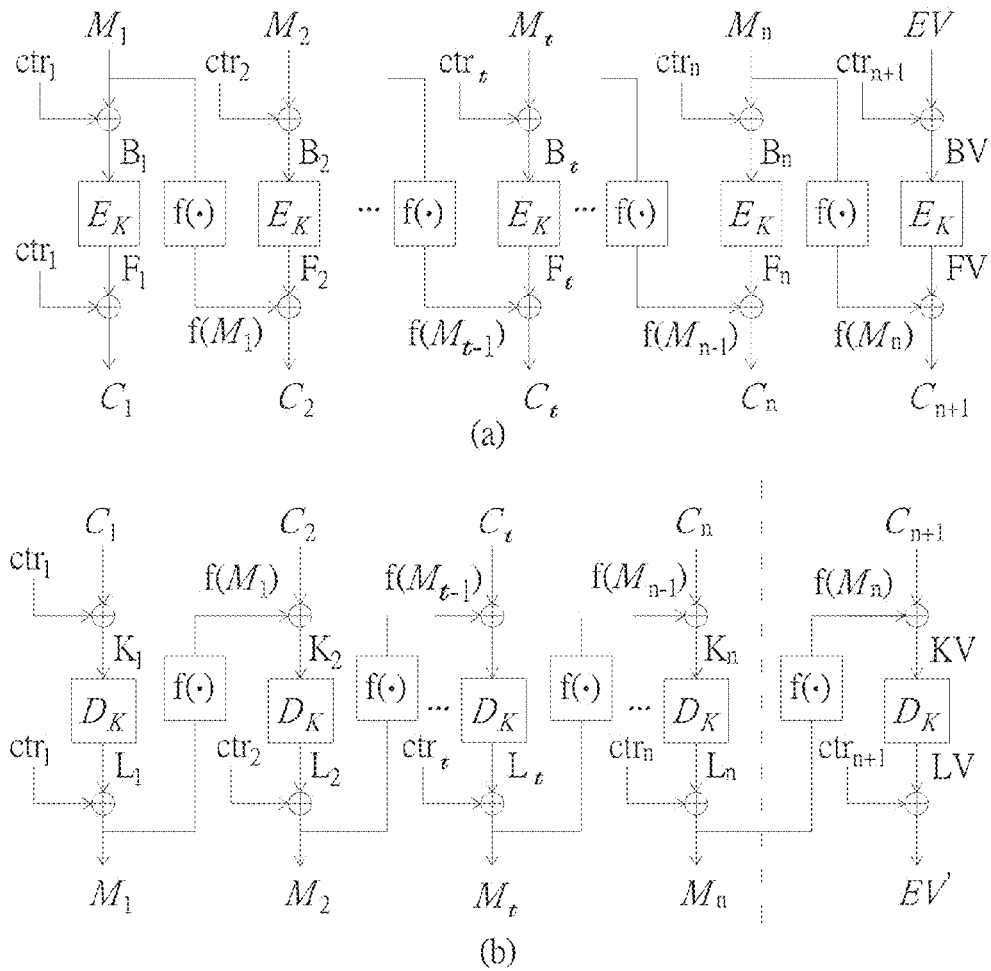
FIG. 1 is a schematic view of the method for authenticated encryption and decryption according to a first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Referring to FIG. 1, it is a schematic view of the method for authenticated encryption and decryption according to a first embodiment of the present application. As shown in part (a) of the FIG. 1, the first input encryption parameter of the t-th path of the n encryption paths comprises a t-th output $ctr_t$ of a counter, $1 \leq t \leq n$. An Exclusive OR logic computation is performed for the first input encryption parameter $ctr_t$ and a t-th plain text $M_t$ so as to generate a first middle encryption value $B_t$. Using a block encryption $E_K$ to encrypt the first middle encryption value $B_t$ so as to generate a second middle encryption value $F_t$. Next, the second input encryption parameter $G_t$ is proved to the t-th path of the n encryption paths, wherein $G_1$ is the first output $ctr_1$ of the counter, G2~Gn are the function $f(M_1)$~$f(M_{n-1})$ with an input parameter of binary plain text $M_1$~$M_{n-1}$, respectively. The function f($M_1$)~f($M_{n-1}$) may include the original binary plain text $M_1$~$M_{n-1}$. Performing an Exclusive OR logic computation for the second middle encryption value $F_t$ and $G_t$ so as to generate a cipher text $C_t$. In addition, further providing an encryption/authentication path to n encryption paths. The Exclusive OR logic computation is performed for the (n+1)-th output $ctr_{n+1}$ of the counter in the encryption/authentication path and an ending vector EV, so as to generate a first middle encryption/authentication value BV. Using an encryption kernel $E_K$ to encrypt the first middle encryption/authentication value BV, so as to generate second middle encryption/authentication value FV. Next, the Exclusive OR logic computation is performed for the second middle encryption/authentication value FV and the function f($M_n$) with the input parameter of the plain text $M_n$, so as to generate a cipher text $C_{n+1}$.

As shown in part (b) of the FIG. 1, a first input decryption parameter $J_t$ is proved to a t-th path of n decryption paths, $J_1$ is a first output ctr1 of a counter and $J_2$~$J_n$ indicate the function f($M_1$)~f($M_{n-1}$) with the input parameter of decrypted plain text $M_1$~$M_{n-1}$, wherein f($M_1$)~f($M_{n-1}$) may comprise the decrypted plain text $M_1$~$M_{n-1}$. The Exclusive OR logic computation is performed for the first input decryption parameter $J_t$ and the t-th cipher text $C_t$, so as to generate first middle decryption value $K_t$. Next, the first middle decryption value $K_t$ is decrypted by a decryption kernel $D_K$, so as to generate a second middle decryption value $L_t$. Next, the Exclusive OR logic computation is performed for the second middle decryption value $L_t$ and a second input decryption parameter $ctr_t$, so as to generate a decrypted plain text $M_t$. Besides, further providing a decryption/authentication path to the n encryption paths. The function f($M_n$) with the input parameter of the decrypted plain text $M_n$ is provided to the decryption/authentication path. The Exclusive OR logic computation is performed for the function f($M_n$) and a cipher text $C_{n+1}$, so as to generate a first middle decryption/authentication value KV. Using a decryption kernel DK to decrypt the first middle decryption/authentication value KV, so as to generate second middle decryption/authentication value LV. The Exclusive OR logic computation is performed for the second middle decryption/authentication value LV and the (n+1)-th output $ctr_{n+1}$ of a counter, so as to generate a second ending vector EV'. The process of the encryption and the decryption is correct if the second ending vector EV' is equal to the first ending vector EV. The method can be used in the Counter Mode (CTR) of the traditional Block cipher mode.

Figure 2:
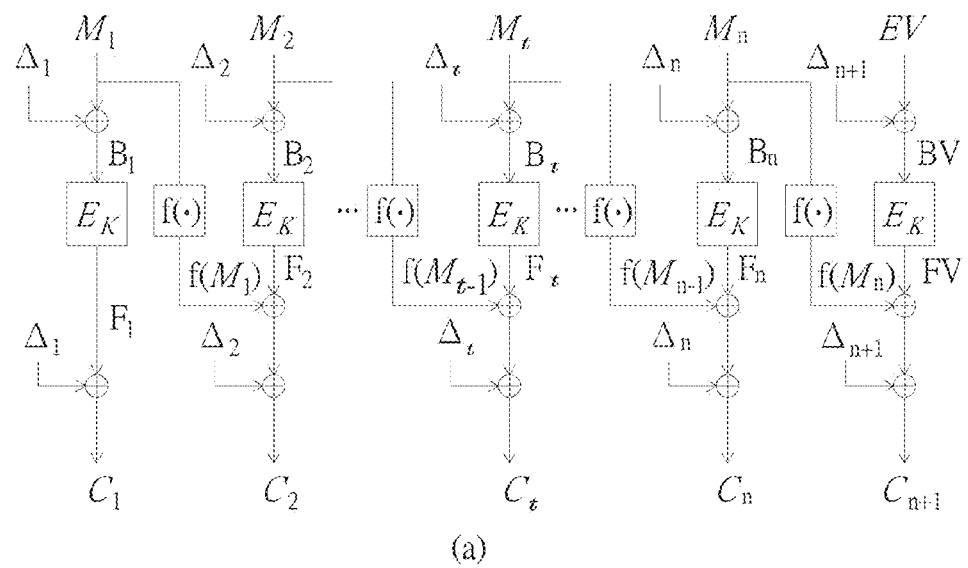
FIG. 2 is a schematic view of the method for authenticated encryption and decryption according to a second embodiment of the present application.
Figure 2:
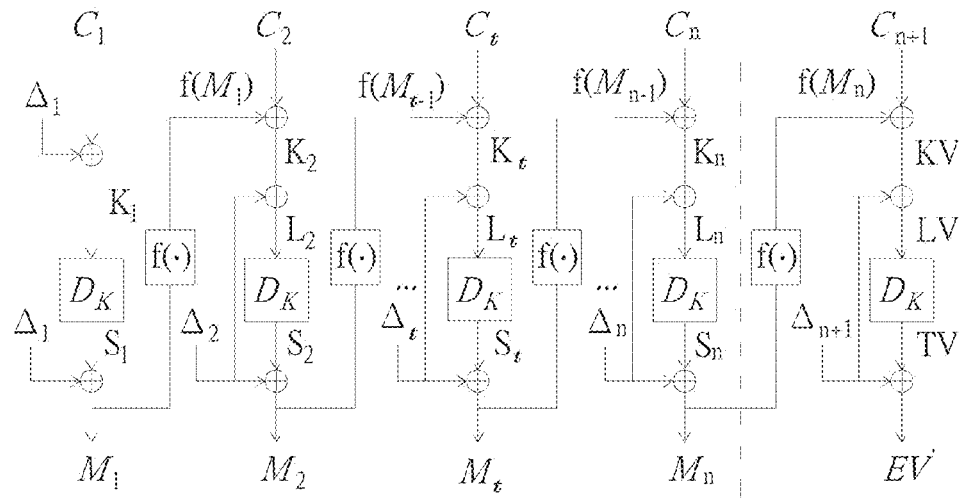

Referring to FIG. 2, it is a schematic view of the method for authenticated encryption and decryption according to a second embodiment of the present application. As shown in part (a) of the FIG. 2, a first input encryption parameter $A_t$ of the t-th path of the n encryption paths comprises an incrementing function $\Delta_t$. The Exclusive OR logic computation is performed for the first input encryption parameter $A_t$ and the t-th plain text $M_t$, so as to generate a first middle encryption value $B_t$. Next, using a block encryption $E_K$ to encrypt $B_t$ so as to generate a second middle encryption value $F_t$. Next, a second input encryption parameter $G_t$ is provided to the t-th path of the n encryption paths correspondingly, $G_1$ comprises an incrementing function $\Delta_1$, $G_2$~$G_n$ are the results of performing the Exclusive OR logic computation for the function f($M_1$)~f($M_{n-1}$) with the input parameter of binary plain text $M_1$~$M_{n-1}$ and the incrementing function $\Delta_2$~$\Delta_n$, correspondingly, wherein the function f($M_1$)~f($M_{n-1}$) may include the binary plain text $M_1$~$M_{n-1}$. The Exclusive OR logic computation is performed for the second middle encryption value $B_t$ and the second input encryption parameter $G_t$, so as to generate the cipher text $C_t$. The incrementing function $\Delta_{n+1}$ is provided to an encryption/authentication path. The Exclusive OR logic computation is performed for the incrementing function $\Delta_{n+1}$ and a first ending vector EV, so as to generate a first middle encryption/authentication value BV. Using an encryption kernel EK to encrypt the first middle encryption/authentication value BV so as to generate a second middle encryption/authentication value FV. Next, the Exclusive OR logic computation is performed for the second middle encryption/authentication value FV, the function f($M_n$) with the input parameter of the plain text $M_n$, and an incrementing function $\Delta_{n+1}$, so as to generate a cipher text $C_{n+1}$.

As shown in part (b) of the FIG. 2, providing an input data of decryption Jt of the t-th path of the n encryption paths. $J_1$ is an incrementing function $\Delta_1$, $J_2$~$J_n$ indicate the function f($M_1$)~f($M_{n-1}$) with the input parameter of decrypted plain text $M_1$~$M_{n-1}$, respectively, wherein f($M_1$)~f($M_{n-1}$) may comprise decrypted plain text $M_1$~$M_{n-1}$. The Exclusive OR logic computation is performed for the first input decryption parameter $J_t$ and the t-th cipher text $C_t$, so as to generate first middle decryption value $K_t$. Next, the Exclusive OR logic computation is performed for the first middle decryption value $K_t$ and the incrementing function $\Delta_t$, so as to generate a second middle decryption value $L_t$, 2≤r≤n. Next, decrypting the first middle decryption value $K_1$ and the second middle decryption value $L_t$ by a decryption kernel DK, so as to generate a third middle decryption value $S_t$. The Exclusive OR logic computation is performed for third middle decryption value $S_t$ and an incrementing function $\Delta_t$, so as to generate a decrypted plain text $M_t$, 1≤t≤n. Besides, providing the function f($M_n$) with the input parameter of the decrypted plain text $M_n$ to the decryption/authentication path. The Exclusive OR logic computation is performed for the function f($M_n$) and a cipher text $C_{n+1}$, so as to generate a first middle decryption/authentication value KV. The Exclusive OR logic computation is performed for the first middle decryption/authentication value KV and an incrementing function $\Delta_{n+1}$, so as to generate a second middle decryption/authentication value LV. Using a decryption kernel DK to decrypt the second middle decryption/authentication value LV so as to generate a third middle decryption/authentication value TV. The Exclusive OR logic computation is performed for the third middle decryption/authentication value TV and the incrementing function $\Delta_{n+1}$ so as to generate a second ending vector EV'. The process of the encryption and the decryption is correct if the first ending vector EV is equal to the second ending vector EV'.

Figure 3:
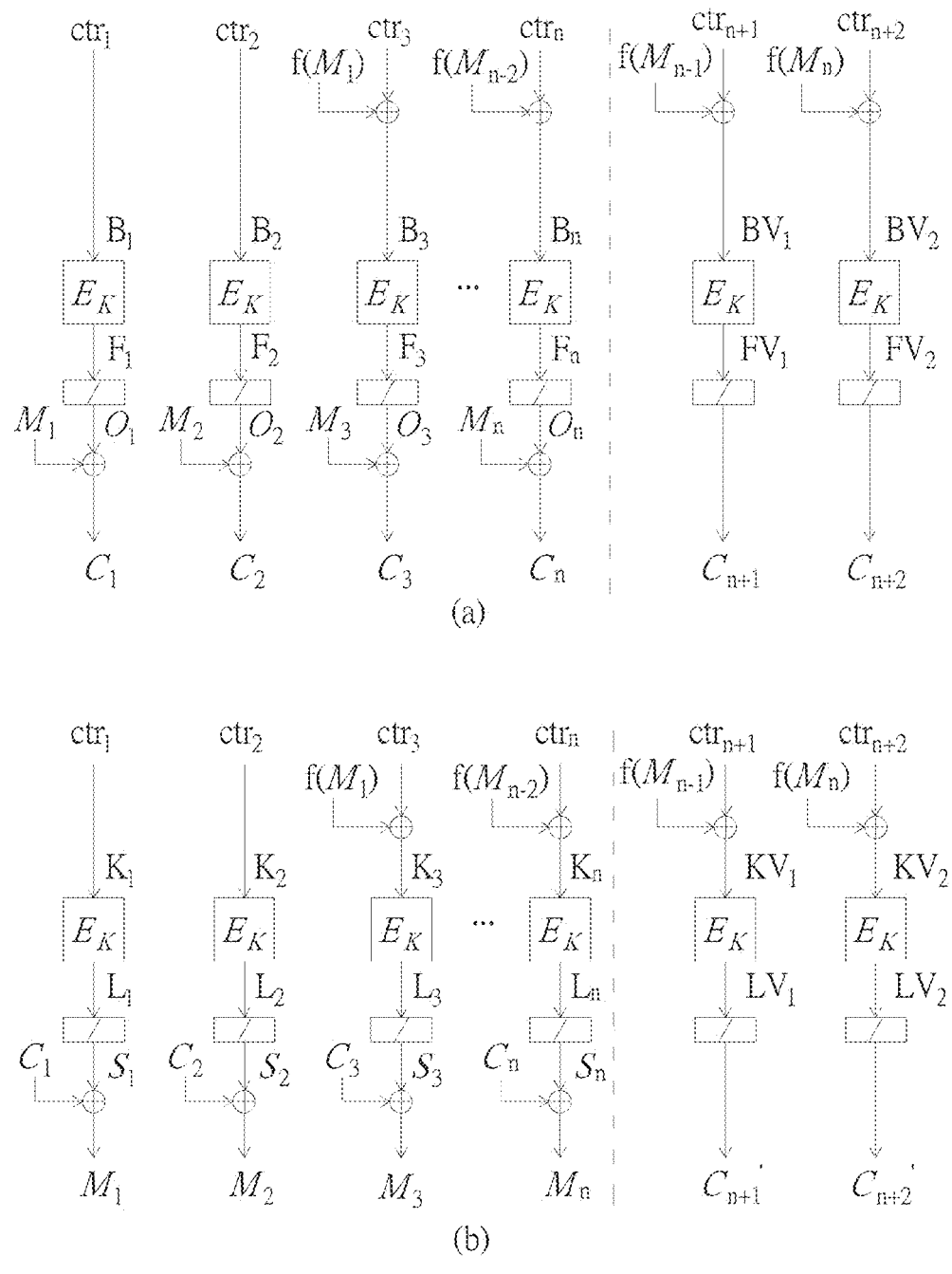
FIG. 3 is a schematic view of the method for authenticated encryption and decryption according to a third embodiment of the present application.

Referring to FIG. 3, it is a schematic view of the method for authenticated encryption and decryption according to a third embodiment of the present application. As shown in part (a) of the FIG. 3, the first input encryption parameter $A_i$ of the i-th path of the n encryption paths and the p encryption/authentication paths comprises the i-th output $ctr_i$ of a counter, 1≤i≤n+p, and 2≤p. In the last (n–p) paths of the n encryption paths, the Exclusive OR logic computation is performed for the first input encryption parameter $A_{p+d}$ and the function f($M_d$) with the input parameter of the plain text $M_d$, so as to generate a first middle encryption value $B_{p+d}$, wherein f($M_d$) may comprise the plain text $M_d$ and 1≤d≤(n–p). Using a block encryption EK to encrypt $B_t$ so as to generate a second middle encryption value $F_t$, 1≤t≤n. The computation of shift register is performed for the second middle encryption value $F_t$ of the n encryption paths, so as to generate a third middle encryption value $O_t$. The Exclusive OR logic computation is performed for the third middle encryption value $O_t$ of the n encryption paths and the binary plain text $M_t$, so as to generate the cipher text $C_t$. In the p encryption/authentication paths, the Exclusive OR logic computation is performed for the first encryption/authentication parameter $A_{n+j}$ and the function $f(M_{n-p+j})$ with the input parameter of the plain text $M_{n-p+j}$, so as to generate the first middle encryption/authentication value $BV_j$, wherein $f(M_{n-p+j})$ may comprise the plain text $M_{n-p+j}$, $1 \leq j \leq p$. Using a block encryption EK to encrypt the first middle encryption/authentication value $BV_j$ so as to generate a second middle encryption/authentication value $FV_j$. A shift logic computation is performed for the second middle encryption/authentication value $FV_j$ so as to generate the cipher text $C_{n+j}$.

As shown in part (b) of the FIG. 3, the t-th output of a counter is provided to the t-th path of the n decryption paths, $1 \leq t \leq n$. In the last (n−p) paths of the n decryption paths, the Exclusive OR logic computation is performed for the first input decryption parameter $ctr_{p+d}$ and the function $f(M_d)$ with the input parameter of decrypted plain text $M_d$, so as to generate a first middle decryption value $K_{p+d}$, wherein $f(M_d)$ may comprise the decrypted plain text $M_d$, $1 \leq d \leq (n-p)$. Next, using a block encryption EK to decrypt a first middle decryption value $K_t$ so as to generate a second middle decryption value $L_t$. The computation of shift register is performed for the second middle decryption value $L_t$ so as to generate the third middle decryption value $S_t$. The Exclusive OR logic computation is performed for the third middle decryption value $S_t$ and the cipher text $C_t$ so as to generate the decrypted plain text $M_t$. The (n+j)-th output $ctr_{n+j}$ of the counter is provided to the j-th path of the p decryption/authentication paths, $1 \leq j \leq p$. The Exclusive OR logic computation is performed for the $ctr_{n+j}$ and the function $f(M_{n-p+j})$ with the input parameter of the decrypted plain text $M_{n-p+j}$, so as to generate the first middle decryption/authentication value $KV_j$, wherein $f(M_{n-p+j})$ may comprise the plain text $M_{n-p+j}$. Next, using a block encryption EK to decrypt the first middle decryption value $KV_j$ so as to generate a second middle decryption/authentication value $LV_j$. A computation of shift register is perform for the second middle decryption/authentication value $LV_j$ so as to generate the authenticated cipher text $C_{n+j}'$, $1 \leq j \leq p$. The process of the encryption and the decryption is correct if the cipher text $C_{n+j}$ is equal to the authenticated cipher text $C_{n+j}'$. In the method for authenticated encryption and decryption, the value p may determine the maximum scale of parallel processing of a processor to achieve the effect for authenticated encryption and decryption in real-time streams.

Figure 4:
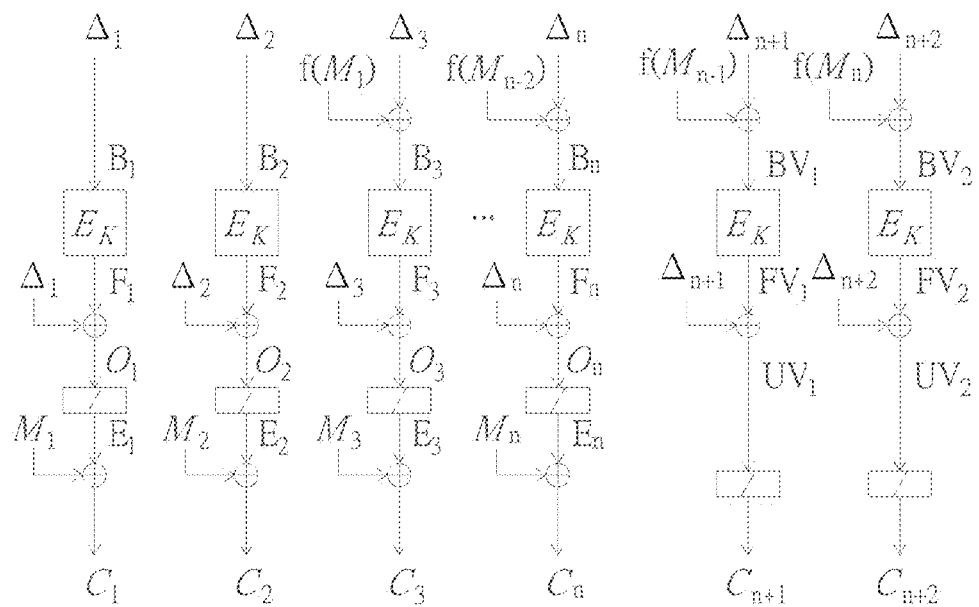
FIG. 4 is a schematic view of the method for authenticated encryption and decryption according to a fourth embodiment of the present application.
Figure 4:
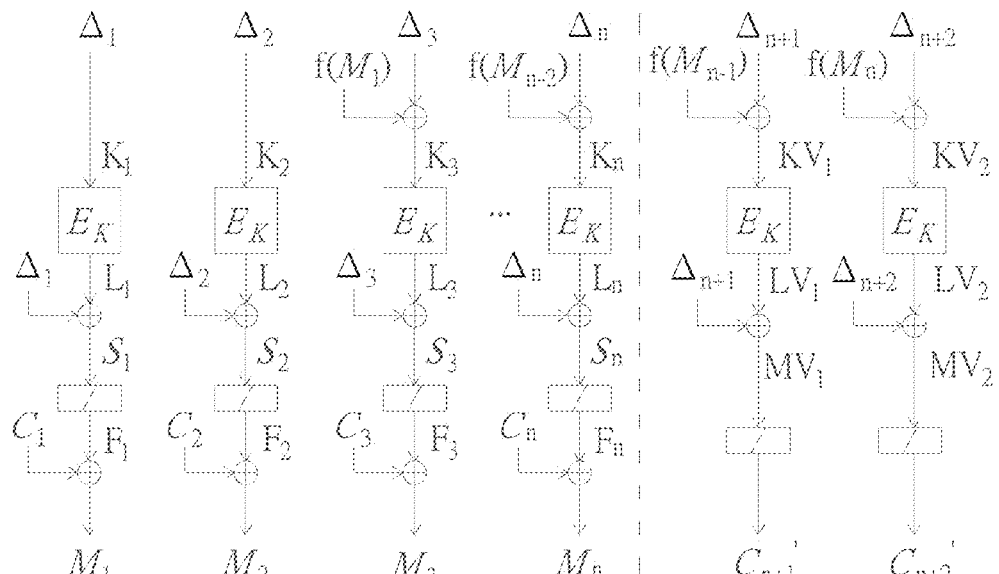

Referring to FIG. 4, it is a schematic view of the method for authenticated encryption and decryption according to a fourth embodiment of the present application. As shown in part (a) of the FIG. 4, the first input encryption parameter of the n encryption paths and the i-th path of the p encryption/authentication paths comprises an incrementing function $\Delta_i$, $1 \leq i \leq n+p$ and $2 \leq p$. In the last (n−p) paths of the n decryption paths, the Exclusive OR logic computation is performed for the incrementing function $\Delta_{p+d}$ and the function $f(M_d)$ with the input parameter of the plain text $M_d$ so as to generate a first middle encryption value $B_{p+d}$, wherein $f(M_d)$ may comprise the plain text $M_d$, $1 \leq d \leq (n-p)$. Using a block encryption EK to encrypt $B_t$ so as to generate a second middle encryption value $F_t$, $1 \leq t \leq n$. The Exclusive OR logic computation is performed for the second middle encryption value $F_t$ and the incrementing function $\Delta_t$ so as to generate a third middle encryption value $O_t$. The computation of shift register is performed for the third middle encryption value $O_t$ so as to generate the fourth middle encryption value $E_t$. The Exclusive OR logic computation is performed for the fourth middle encryption value $E_t$ and a plain text $M_t$ so as to generate the cipher text $C_t$. In the p encryption/authentication paths, the Exclusive OR logic computation is performed for the incrementing function $\Delta_{n+j}$ and the function $f(M_{n-p+j})$ with the input parameter of the plain text $M_{n-p+j}$ so as to generate the first middle encryption/authentication value $BV_j$, wherein $f(M_{n-p+j})$ may comprise the plain text $M_{n-p+j}$, $1 \leq j \leq p$. Using a block encryption EK to encrypt the first middle encryption/authentication value $BV_j$ so as to generate a second middle encryption/authentication value $FV_j$. The Exclusive OR logic computation is performed for the second middle encryption/authentication value $FV_j$ and an incrementing function $\Delta_{n+j}$, so as to generate a third middle encryption/authentication value $UV_j$. A computation of shift register is performed for the third middle encryption/authentication value $UV_j$ so as to generate the cipher text $C_{n+j}$.

As shown in part (b) of the FIG. 4, an incrementing function $\Delta_t$ is provided to the t-th path of the n decryption paths, $1 \leq t \leq n$. In the last (n−p) paths of the n decryption paths, the Exclusive OR logic computation is performed for the incrementing function $\Delta_{p+d}$ and the function $f(M_d)$ with the input parameter of the plain text $M_d$ so as to generate a first middle decryption value $K_{p+d}$, wherein $f(M_d)$ may comprise the plain text $M_d$, $1 \leq d \leq (n-p)$. Using a block encryption EK to decrypt $K_t$ so as to generate a second middle decryption value $L_t$. The Exclusive OR logic computation is performed for the second middle decryption value $L_t$ and the incrementing function $\Delta_t$ so as to generate a third middle decryption value $S_t$. Performing the computation of shift register for the third middle decryption value $S_t$ so as to generate the fourth middle decryption value $F_t$. The Exclusive OR logic computation is performed for the fourth middle decryption value Ft and the cipher text $C_t$ so as to generate the decrypted plain text $M_t$. In the p encryption/authentication paths, the Exclusive OR logic computation is performed for the incrementing function $\Delta_{n+j}$ of a first input decryption/authentication parameter and the function $f(M_{n-p+j})$ with the input parameter of the decrypted plain text $M_{n-p+j}$ so as to generate the first middle decryption/authentication value $KV_j$, wherein $f(M_{n-p+j})$ may comprise the decrypted plain text $M_{n-p+j}$. Next, using a block encryption EK to decrypt $KV_j$ so as to generate a second middle decryption/authentication value $LV_j$. The Exclusive OR logic computation is performed for the second middle decryption/authentication value $LV_j$ and an incrementing function $\Delta n+j$, so as to generate a third middle encryption/authentication value $MV_{n+j}$, $1 \leq j \leq p$. The computation of shift register is perform for the third middle decryption/authentication value $MV_{n+j}$, so as to generate the authenticated cipher text $C_{n+j}'$. The process of the encryption and the decryption is correct if the cipher text $C_{n+j}$ is equal to the authenticated cipher text $C_{n+j}'$, $1 \leq j \leq p$. In the method for authenticated encryption and decryption the value p may determine the maximum scale of parallel processing of a processor to achieve the effect for authenticated encryption and decryption in real-time streams.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for authenticated encryption and decryption, comprising:
   receiving a binary plain text at an encryption end;
   performing an encryption process according to the binary plain text data, the encryption process comprising following steps:
   providing n encryption paths, wherein n is a positive integer;

providing a first input encryption parameter $A_t$ to the t-th path of the n encryption paths correspondingly, wherein t is an integer, $1 \leq t \leq n$, $0 \leq r < t$, r is an integer, and $A_{t+r}$ is a function $f(M_t)$ with an input parameter of a binary plain text $M_t$;

performing a first encryption logic computation for the first input encryption parameter $A_t$ of the t-th path correspondingly, to generate a first middle encryption value $B_t$;

performing an encryption computation for the first middle encryption value $B_t$ of the t-th path and an encryption kernel correspondingly so as to generate a second middle encryption value $F_t$;

providing a second input encryption parameter $G_t$ to the t-th path of the n encryption paths correspondingly, wherein $0 \leq s < t$, s is an integer, and $G_{t+s}$ is a function $f(M_t)$ with an input parameter of the binary plain text $M_n$;

performing a second encryption logic computation for the second middle encryption value $F_t$ of the t-th path and the second input encryption parameter $G_t$, to generate a cipher text $C_t$;

providing p encryption/authentication paths, wherein p is a positive integer;

providing a first encryption/authentication parameter $AV_j$ to a j-th path of p encryption/authentication paths correspondingly, wherein $1 \leq j \leq p$;

performing a first encryption/authentication logic computation for the first encryption/authentication parameter $AV_j$ of the j-th encryption/authentication path correspondingly, to generate a first middle encryption/authentication value $BV_j$;

performing an encryption computation for the first middle encryption/authentication value $BV_j$ of the j-th encryption/authentication path and the encryption kernel correspondingly, to generate a second middle encryption/authentication value $FV_j$ of the j-th encryption/authentication path;

providing a second encryption/authentication data $GV_j$ to the j-th path;

performing a second encryption/authentication logic computation for the second middle encryption/authentication value $FV_j$ of the j-th encryption/authentication path and the second encryption/authentication data $GV_j$ correspondingly, to generate a cipher text $C_{n+j}$;

receiving the cipher text $C_{n+j}$ at a decryption end and performing a decryption process, the decryption process comprising following steps:

providing n decryption paths;

providing a first input decryption parameter $J_t$ to a t-th path of the n decryption paths correspondingly, wherein $1 \leq t \leq n$;

performing a first decryption logic computation for the first input decryption parameter $J_t$ of the t-th path correspondingly so as to generate a first middle decryption value $K_t$;

performing a decryption computation for the first middle decryption value $K_t$ of the t-th path and a decryption kernel correspondingly, to generate a second middle decryption value $L_t$;

performing a second logic decryption computation for the second middle decryption value $L_t$ of the t-th path and a second input decryption parameter $N_t$, to generate a decrypted binary plain text $M_t'$;

providing p decryption/authentication paths, wherein p is a positive integer;

providing a first decryption-authentication parameter $JV_j$ to a j-th decryption/authentication path of the p decryption/authentication paths correspondingly, wherein $1 \leq j \leq p$;

performing a first logic decryption/authentication computation for the first decryption-authentication parameter $JV_j$ of the j-th decryption/authentication path correspondingly so as to generate a first middle decryption/authentication value $KV_j$;

performing a decryption computation for the first middle decryption value $KV_j$ of the j-th decryption/authentication path and the decryption kernel correspondingly so as to generate a second middle decryption/authentication value $LV_j$ of the j-th decryption/authentication path; and performing a second logic decryption/authentication computation for the second middle decryption/authentication value $LV_j$ of the j-th decryption/authentication path and second decryption/authentication data $NV_j$ so as to generate a decryption/authentication plain text $MV_j$.

2. The method for authenticated encryption and decryption of claim 1, wherein in the encryption process, r=0 and s=1, the first input encryption parameter $A_t$ of the t-th path of the n encryption paths further comprises a t-th output $ctr_t$ of a counter, $1 \leq t \leq n$, the first encryption logic computation is an Exclusive OR logic computation which is performed for the first input encryption parameter $A_t$ to generate the first middle encryption value $B_t$, the encryption kernel is a block encryption $E_K$ controlled by a positive integer K, the second input encryption parameter $G_1$ of the first path of the n encryption paths is a first output $ctr_1$ of the counter, the second encryption logic computation is another Exclusive OR logic computation, p=1, the first encryption/authentication logic computation and the second encryption/authentication logic computation are an Exclusive OR logic computation correspondingly, the first encryption/authentication parameter $AV_p$ is a default EV (Ending Vector) and a (n+1)-th output $ctr_{n+1}$ of the counter, the second encryption/authentication data $GV_p$ comprises the function $f(M_n)$ with an input parameter of the binary plain text $M_n$, wherein in the decryption process, s=1, the first input decryption parameter $J_1$ of the first path of the n decryption paths comprises the first output $ctr_1$ of the counter, the first input decryption parameter $J_{t+s}$ comprises the function $f(M_t')$ with an input parameter of the decrypted binary plain text $M_t'$, $1 \leq t \leq n$, the first decryption logic computation is an Exclusive OR logic computation and it is performed for the cipher text $C_t$ and the first input decryption parameter $J_t$ so as to generate the first middle decryption value $K_t$, the decryption kernel is a block decryption $D_K$ controlled by a positive integer K, the second logic decryption computation is an Exclusive OR logic computation, the second input decryption parameter $N_t$ of the t-th path of the n decryption paths is a t-th output $ctr_t$ of the counter, p=1, the first logic decryption/authentication computation is an Exclusive OR logic computation, the cipher text $C_{n+p}$ and the first decryption/authentication parameter $JV_p$ comprises the function $f(M_n')$ with an input parameter of the decrypted binary plain text $M_n'$ to perform the first logic decryption/authentication computation, the second logic decryption/authentication computation is an Exclusive OR logic computation, and the second decryption/authentication data $NV_p$ is a (n+p)-th output $ctr_{n+p}$ of the counter.

3. The method for authenticated encryption and decryption of claim 1, wherein in the encryption process, r=0 and s=1, the first input encryption parameter $A_t$ of the t-th path of the n encryption paths further comprises an incrementing function $\Delta_t$, 1≤t≤n and $\Delta_1 \neq \Delta_2 \neq \ldots \neq \Delta_n$, the first encryption logic computation is an Exclusive OR logic computation and it is performed for the first input encryption parameter $A_t$ so as to generate the first middle encryption value $B_t$, the encryption kernel is a block encryption $E_K$ controlled by a positive integer K, the second input encryption parameter $G_1$ of the first path of the n encryption paths is the incrementing function $\Delta_1$, the second encryption logic computation is an Exclusive OR logic computation, the Exclusive OR logic computation is performed for the cipher text $C_h$ and the incrementing function $\Delta_h$ so as to generate a cipher text $C_h'$, s<h≤n, p=1, the first encryption/authentication logic computation and the second encryption/authentication logic computation are an Exclusive OR logic computation correspondingly, the first encryption/authentication parameter $AV_p$ comprises a default EV (Ending Vector) and the incrementing function $\Delta_{n+p}$, the second encryption/authentication data $GV_p$ comprises a function $f(M_n)$ with an input parameter of the binary plain text $M_n$, and an Exclusive OR logic computation is further performed for the cipher text $C_{n+p}$ and an incrementing function $\Delta_{n+p}$ so as to generate a cipher text $C_{n+p}'$;

wherein in the decryption process, s=1, the first input decryption parameter $J_1$ of the first path of the n decryption paths comprises the incrementing function $\Delta_1$, the first input decryption parameter $J_{t+s}$ is a result of performing an Exclusive OR logic computation for the function $f(M_t)$ with an input parameter of the binary plain text $M_t$ and an incrementing function $\Delta_{t+s}$, 1≤t≤n, the first decryption logic computation is an Exclusive OR logic computation and it is performed for the cipher text $C_t'$ and the first input decryption parameter $J_t$ so as to generate the first middle decryption value $K_t$, the decryption kernel is a block decryption $D_K$ controlled by a positive integer K, the second logic decryption computation is an Exclusive OR logic computation, the second input decryption parameter $N_t$ of the t-th path of the n decryption paths is the incrementing function $\Delta_t$, p=1, the first logic decryption/authentication computation is an Exclusive OR logic computation, the first decryption-authentication parameter $JV_p$ is a result of performing an Exclusive OR logic computation for the function $f(M_n')$ with an input parameter of the binary plain text $M_n'$ and the incrementing function $\Delta_{n+p}$, the second logic decryption/authentication computation is an Exclusive OR logic computation, and the second decryption/authentication data $NV_p$ is the incrementing function $\Delta_{n+p}$.

4. The method for authenticated encryption and decryption of claim 1, wherein in the encryption process, s=0, r=p, and 2≤p, the first encryption logic computation is not provided to the top p paths of the n encryption paths, in the last (n−p) paths of the n encryption paths and the p encryption/authentication paths, the first encryption logic computation and first encryption/authentication logic computation comprises an Exclusive OR logic computation, the encryption kernel is a block encryption $E_K$ controlled by a positive integer K, the second encryption logic computation of the n encryption paths comprises a computation of shift register and an Exclusive OR logic computation sequentially, the computation of shift register outputs an input value after shifting the input value by g bits, and g is a positive integer, the second encryption logic computation of the p encryption paths comprises a computation of shift register, and the computation of shift register outputs an input value after shifting the input value by g bits, from the first encryption path to the top p encryption paths, the first input encryption parameter $A_c$ of a c-th path comprises a c-th output $ctr_c$ of the counter, 1≤c≤p, the first input encryption parameter $A_d$ of the d-th path of the last (n−p) encryption paths further comprises a d-th output $ctr_d$ of the counter, wherein p+1≤d≤n, the first encryption/authentication parameter $AV_j$ of the p encryption/authentication paths comprises the function $f(M_{n+j-p})$ with the input parameter of the binary plain text $M_{n+j-p}$ and the (n+j)-th output $ctr_{n+j}$ of the counter, wherein 1≤j≤p, and the second encryption/authentication data $GV_j$ is not provided to the p encryption/authentication paths;

wherein, in the decryption process, s=0, the first decryption logic computation is not provided to the top p paths of the n decryption paths, in the last (n−p) paths of the n encryption paths and the p encryption/authentication paths, the first decryption logic computation and the first logic decryption/authentication computation comprises an Exclusive OR logic computation, the decryption kernel is the block encryption $E_K$, K is a positive integer, the second logic decryption computation of the n decryption paths comprises a computation of shift register and an Exclusive OR logic computation sequentially, and the computation of shift register outputs an input value after shifting the input value by g bits, the second logic decryption computation of the p encryption paths comprises a computation of shift register, and the computation of shift register outputs an input value after shifting the input value by g bits, from the first decryption path to the top p decryption paths, the first input decryption parameter $J_c$ of a c-th path comprises a c-th output $ctr_c$ of the counter, wherein 1≤c≤p, the first input decryption parameter $J_d$ of a d-th path in the last (n−p) decryption paths further comprises a d-th output $ctr_d$ of the counter and the function $f(M_{d-p}')$ with an input parameter of the decrypted binary plain text $M_{d-p}'$, wherein p+1≤d≤n, the second input decryption parameter $N_t$ of the n decryption paths is the cipher text $C_t$, $1 \le t \le n$, the first decryption-authentication parameter $JV_j$ of the p decryption/authentication paths comprises the $(n+j)$ output $ctr_{n+j}$ of the counter and the function $f(M_{n+j-p}')$ with an input parameter of the decrypted binary plain text $M_{n+j-p}'$, $1 \le j \le p$, and the second decryption/authentication data $NV_j$ is not provided to the p decryption/authentication paths.

5. The method for authenticated encryption and decryption of claim 1, wherein in the encryption process, s=0, r=p, and $2 \le p$, the first encryption logic computation is not provided to the top p paths of the n encryption paths, in the last (n−p) paths of the n encryption paths and the p encryption/authentication paths, the first encryption logic computation and first encryption/authentication logic computation comprise an Exclusive OR logic computation, the encryption kernel is a block encryption $E_K$ controlled by a positive integer K, the second encryption logic computation of the n decryption paths comprises a computation of shift register and an Exclusive OR logic computation sequentially, wherein the computation of shift register outputs an input value after shifting g bits of the input value, the second encryption/authentication logic computation of the p encryption/authentication paths comprises an Exclusive OR logic computation and a computation of shift register, wherein the computation of shift register outputs an input value after shifting the input value by g bits, from the first encryption path to the top p encryption paths, the first input encryption parameter $A_c$ of a c-th path comprises an incrementing function $\Delta_c$, $1 \le c \le p$, and $\Delta_1 \ne \Delta_2 \ne \ldots \ne \Delta_p$, the first input encryption parameter $A_d$ of a d-th encryption path within the last (n−p) encryption paths further comprises the incrementing function $\Delta_d$, $p+1 \le d \le n$, and $\Delta_{p+1} \ne \Delta_{p+2} \ne \ldots \ne \Delta_n$, an Exclusive OR logic computation is performed for the second middle encryption value $F_t$ and an incrementing function $\Delta_t$ so as to generate another second middle encryption value $F_t'$, wherein $\Delta_1 \ne \Delta_2 \ne \ldots \ne \Delta_n$, the first encryption/authentication parameter $AV_j$ of the p encryption/authentication paths comprises the function $f(M_{n+j-p}')$ with the input parameter of the binary plain text $M_{n+j-p}'$ and the incrementing function $\Delta_{n+j}$, wherein $1 \le j \le p$, and the second encryption/authentication data $GV_j$ of the p encryption/authentication paths comprises an incrementing function $\Delta_{n+j}$;

wherein in the decryption process, s=0, the first decryption logic computation is not provided to the top p paths of the n decryption paths, in the last (n−p) paths of the n encryption paths and the p encryption/authentication paths, the first decryption logic computation and the first logic decryption/authentication computation comprise an Exclusive OR logic computation, the decryption kernel is the block encryption $E_K$, K is a positive integer, the second logic decryption computation of the n decryption paths comprises a computation of shift register and an Exclusive OR logic computation sequentially, wherein the computation of shift register outputs an input value after shifting g bits of the input value, the second encryption/authentication logic computation of the p encryption/authentication paths comprises an Exclusive OR logic computation and a computation of shift register, wherein the computation of shift register outputs an input value after shifting the input value by g bits, from the first decryption path to the top p decryption paths, the first input decryption parameter $J_c$ of a c-th path comprises the incrementing function $\Delta_c$, wherein $1 \le c \le p$, the first input decryption parameter $J_d$ of a d-th path in last (n−p) decryption paths further comprises the incrementing function $\Delta_d$ and the function $f(M_{d-p}')$ with the input parameter of the decrypted binary plain text $M_{d-p}'$, wherein $p+1 \le d \le n$, an Exclusive OR logic computation is performed for the second middle decryption value $L_t$ and the incrementing function $\Delta_t$ so as to generate another second middle decryption value $L_t'$, $1 \le t \le n$, the second input decryption parameter $N_t$ of the n decryption paths comprises the cipher text $C_t$, the first decryption-authentication parameter $JV_j$ of the p decryption/authentication paths comprises the incrementing function $\Delta_{n+j}$ and the function $f(M_{n+j-p}')$ with the input parameter of the decrypted binary plain text $M_{n+j-p}'$, wherein $1 \le j \le p$; and the second decryption/authentication data $NV_j$ of the p decryption/authentication paths comprises an incrementing function $\Delta_{n+j}$.

* * * * *